US009982735B2

(12) United States Patent
Thye-Moormann (10) Patent No.: US 9,982,735 B2
(45) Date of Patent: May 29, 2018

(54) SUPPLEMENTARY SPRING WITH AXIALLY EXTENDING CONTOUR ELEMENTS

(75) Inventor: Frank Thye-Moormann, Lembruch (DE)

(73) Assignee: BASF SE, Ludwigshafen (DE)

( * ) Notice: Subject to any disclaimer, the term of this patent is extended or adjusted under 35 U.S.C. 154(b) by 438 days.

(21) Appl. No.: 12/520,910

(22) PCT Filed: Sep. 12, 2008

(86) PCT No.: PCT/EP2008/062187
§ 371 (c)(1),
(2), (4) Date: Jun. 23, 2009

(87) PCT Pub. No.: WO2009/037207
PCT Pub. Date: Mar. 26, 2009

(65) Prior Publication Data
US 2010/0025903 A1    Feb. 4, 2010

(30) Foreign Application Priority Data

Sep. 14, 2007   (EP) ..................................... 07116443

(51) Int. Cl.
| F16F 1/36 | (2006.01) |
| F16F 1/373 | (2006.01) |
| F16F 1/376 | (2006.01) |
| F16F 3/08 | (2006.01) |

(52) U.S. Cl.
CPC ............ *F16F 1/3732* (2013.01); *F16F 1/376* (2013.01)

(58) Field of Classification Search
CPC ........... F16F 1/373; F16F 1/3732; F16F 1/376

USPC ....... 267/141, 151, 152, 153, 220, 291, 292, 267/293; 248/560, 638
See application file for complete search history.

(56) References Cited

U.S. PATENT DOCUMENTS

| 2,117,433 | A | * | 5/1938 | Krebs | 123/90.66 |
| 6,296,237 | B1 | * | 10/2001 | Nagai | 267/220 |
| 6,857,626 | B2 | * | 2/2005 | Burlage et al. | 267/220 |
| 7,624,462 | B2 | * | 12/2009 | Cao et al. | 5/655.9 |

FOREIGN PATENT DOCUMENTS

| DE | 195 48 770 | 6/1997 |
| DE | 195 48 771 | 6/1997 |
| DE | 201 09 926 | 11/2001 |
| DE | 203 13 895 | 12/2003 |
| DE | 20 2004 000 620 | 5/2004 |
| DE | 20 2004 008 055 | 9/2004 |
| DE | 20 2005 012 531 | 11/2005 |
| DE | 10 2004 049 638 | 4/2006 |
| DE | 10 2004 049 638 A1 | 4/2006 |

(Continued)

OTHER PUBLICATIONS

English abstract DE-20313895 U1.*

(Continued)

*Primary Examiner* — Melody M Burch
(74) *Attorney, Agent, or Firm* — Oblon, McClelland, Maier & Neustadt, L.L.P.

(57) ABSTRACT

A spring element with a basic geometry which is concentric along the spring axis, including at least one elastomer, the basic geometry of which is concentric about the spring axis and including constrictions and/or widenings that are axially symmetrical along the spring axis.

20 Claims, 6 Drawing Sheets

(56) References Cited

FOREIGN PATENT DOCUMENTS

| EP | 0 036 994 | 10/1981 |
|---|---|---|
| EP | 0 062 835 | 10/1982 |
| EP | 0 250 969 | 1/1988 |
| EP | 1 649 188 B1 | 5/2008 |

OTHER PUBLICATIONS

English Machine Translation of DE-20313895 published Dec. 2003.*
English Machine Translation of DE-20313895.*
FNOK 13/0564-280 Ford-Nissan XF52-3025AB Quest jb.
FNOK 13/0564-270 Tenneco-Monroe 13740006 W-body jb.
FNOK 13/0564-330 Honda 52722-SHJ-A030-20 Odyssey jb.
FNOK 13/0564-318 Chrysler-Smith 04695761 Cradle Mount.
FNOK 13/0564-771 Ford 5C34-3020 P131 jb.

* cited by examiner

SUPPLEMENTARY SPRING WITH AXIALLY EXTENDING CONTOUR ELEMENTS

CROSS-REFERENCE TO RELATED APPLICATIONS

This application is based upon and claims priority under 35 U.S.C. § 371 from International Patent Application No. PCT/EP2008/062187, filed Sep. 12, 2008, and EPO Patent Application No. 07116443.8, filed Sep. 14, 2007.

BACKGROUND OF THE INVENTION

Field of the Invention

The invention relates to a spring element based on elastic material.

Suspension elements are used in automobiles, for example within the chassis, and are generally known. They are used in particular as vibration-damping spring elements. Apart from the main shock absorber, which is often based on metal springs and/or compressed gas elements, further spring elements (supplementary shock absorbers), preferably of elastic material, are almost always used. These spring elements are usually hollow bodies that are concentrically formed and have varying diameters and/or wall thicknesses along the spring axis. In principle, these spring elements could also act as main shock absorbers, but they often act together with the main shock absorber to assume an end-stop function. In this case, they influence the force-displacement characteristics of the sprung wheel by forming or reinforcing a progressive characteristic of the vehicle suspension. The pitching effects of the vehicle can be reduced and the prevention of rolling is enhanced. In particular as a result of the geometrical design, the initial rigidity is optimized, which has a decisive influence on the suspension comfort of the vehicle. This function increases the traveling comfort and ensures a high level of safety on the road. The specifically selected design of the geometry produces component properties that are virtually constant throughout their service lives.

One difficulty in the three-dimensional configuration of the supplementary springs is an often desired particularly smooth commencement of the force take-up, which is also referred to as a smooth start of the spring element. In order to achieve such a smooth start, peripheral bending lips, also referred to as a petal form, are described for example in Offenlegungsschrift DE 102004049638. However, the geometry of the supplementary spring puts limits on the extension of the bending lip, so that the smooth start can also only be varied within very narrow limits. This form with a bending lip is also only suitable to a limited extent for particularly high loads. Furthermore, the bending lip has major disadvantages in production, which is predominantly by a foaming process. In the molding operation, the hollow space of the spring element is usually defined by a core, from which the spring element has to be pulled after curing. The loads occurring thereby on the bending lip in close contact lead to a not insignificant reject rate. A further disadvantage is the laborious flash removal that the production of the bending lip entails.

A further known form that is used comprises configuration of the rim in the form of an undulation, i.e. with variable length of the spring element in the axial direction. This form of the spring element is also set very narrow limits, since the length of the spring element in the axial direction can only be varied within narrow limits, since otherwise the pointed ends can be easily deformed in the radial direction with respect to the damping axis and so no longer reproducibly absorb the force.

SUMMARY OF THE INVENTION

It was consequently an object of the present invention to develop for a spring element, preferably as a supplementary spring in an automobile chassis, a three-dimensional form which permits smoothest possible initial action and has increased stability and improved properties in production.

These requirements are surprisingly met by a spring element (i) of at least one elastomer, the basic geometry of which, which is concentric along the spring axis (ii), comprises axially symmetrical constrictions and/or widenings along the spring axis.

The invention further comprises shock absorbers which comprise a spring element according to the invention, in which this spring element is positioned on the piston rod of the shock absorber and the piston rod, in one preferred embodiment, is positioned in the axis of the hollow spring element.

Furthermore, the invention relates to automobiles, for example passenger cars, trucks, buses and other vehicles, or other devices in which the spring element according to the invention is fitted.

The advantages of such a spring element are many and varied. On the basis of an existing spring element, virtually any desired start of force take-up can be set by the extremely varied formation of the constrictions of the material in the axial direction. The fact that the constrictions are, in the broadest sense, arranged parallel to the axis of movement of the usually concentric spring element means that, in a way known from skeleton construction (cranes, telegraph poles, etc.), the spring elements according to the invention are provided with greater stability as compared with a spring element that attempts to achieve a comparable start of force take-up by concentrically uniform constriction of the spring element. Moreover, the constriction of the wall thickness of a spring element that is usually produced in practice by foaming is restricted in respect of low values by the viscosity of the molding material. In the case of the spring elements according to the invention, the thicker regions permit faster filling with elastomer, which usually takes place from one of the axial openings of the spring element (=hollow body). The thicker regions act during the molding like filling channels into which more elastomer per unit of time can be poured. From these thicker "filling channels", the constricted regions can then also be filled more easily, as compared with a form in which the constriction of the molding covers 360°.

BRIEF DESCRIPTION OF THE DRAWINGS

FIG. 1a shows the side view, FIG. 1b shows the cross section in radial view, FIG. 1c shows a cross section in axial view and FIG. 1d shows a perspective representation of the spring element (i) with an upper end O and a lower end U. Shown are a hollow spring element (i), with a spring axis (ii), contour elements (iii), with a height (xii), an outside diameter (x) and an inside diameter (xi). FIG. 1a furthermore shows with line d a straight line which goes through the longest extent of a contour element and in this preferred case does not form an included angle with the spring axis (ii). The axis d' indicates the imaginary position of the longest extent of a contour element (iii), which forms an included angle e with the spring axis (ii).

FIG. 2a shows the entire spring element, FIG. 2b shows a partial enlargement. In this case, the contour element (iii), a constriction, is defined by being located in the view at the lower end of the spring element. In this embodiment, the constriction is defined by a cylinder with a diameter c, the center axis (iv) of which intersects with the perpendicular (v) to the spring axis (ii) at point A. The point of intersection is a/2 away from the spring axis and forms an included angle b with the perpendicular (iv). The distance between the points of intersection of two points of intersection A which are axially symmetrically opposite one another is designated a. This describes the position of the axially symmetrical constrictions. The angle b is chosen such that the constriction permits the desired smooth start; in a preferred embodiment, it is parallel to the surface of the spring element. The representation shows how a preferred contour element can be very easily defined and can therefore be easily and reproducibly produced. The contour elements are located in each case axially symmetrically, in pairs on the otherwise substantially concentric basic geometry of the spring element (i).

The characteristic curve (k) describes the spring element represented in FIG. 3, the characteristic curve (o) describes a spring element that differs from the spring element described in FIG. 3 only by the absence of the contour elements (iii). Both spring elements were produced from a polyisocyanate polyaddition product, Celasto L, with a density RD of 45. It is found in this measurement that the additionally introduced contour elements (iii) lead to a distinct reduction in the initial rigidity, without the required remaining height of the supplementary spring (fully compressed state) been greatly reduced under the maximum loading of 12 kN. The fully compressed state indicates the length of the compressed spring element and in the present case was in each case 36 mm. The initial range, in which the loading increases from 0 to 0.3 kN, is shown.

Consequently, this novel design element is an effective aid in permitting a smooth start, that is to say a great spring displacement with little force (contact).

The diameters indicated in FIG. 6a), in the order from top to bottom, are: 35 mm, 24 mm, 32 mm, 15.5 mm, 20 mm, 25.8 mm, 39.6 mm. The angles indicated in the figure are from top to bottom 350, 90, 900, 900, 80°, 90°, 90°. The angle (b) in relation to the contour element is 180°−80°=1000. The diameter (c) of this cylinder producing the contour is 12 mm. The outer dimensions to the left and right of the spring element are, read from the left to the right, 3.5 mm, 40 mm, 63 mm, 78 mm, 107 mm, 122+/−2.5 mm. R3 is 3 mm. The detail A is represented once again in FIG. 6c). FIG. 6b represents the supplementary data for the damping element at the section B-B. The diameters, read from top to bottom, are: 58.3 mm, 51.7 mm, 12 mm, 48.4 mm, 20 mm, 28.5 mm, 33.5 mm and 37 mm. The dimensions indicated to the right of the spring element are 3 mm for the distance between the two radii R6, 33.5 mm, 78 mm and 88 mm.

The angles, read from top to bottom, are 45°, 3°, 15°, 36°.

The radii R have the following diameters: R2: 2 mm, R3: 3 mm, R5: 3 mm, R6: 6 mm, R10: 10 mm, R15: 15 mm.

FIG. 6c) represents the detail A from FIG. 6a) on a scale of 1:2. The diameter indications above the figure are, from top to bottom, 38.6 mm and 34.6 mm, the angles from top to bottom are 14° and 14°. R1 is 1 mm. R2: 2 mm.

DETAILED DESCRIPTION OF THE INVENTION

The dimensions may vary greatly in individual cases according to the requirement of individual spring elements. In preferred embodiments, the ratios of the abovementioned dimensions with respect to one another remain the same when the size is changed.

Figure 1:
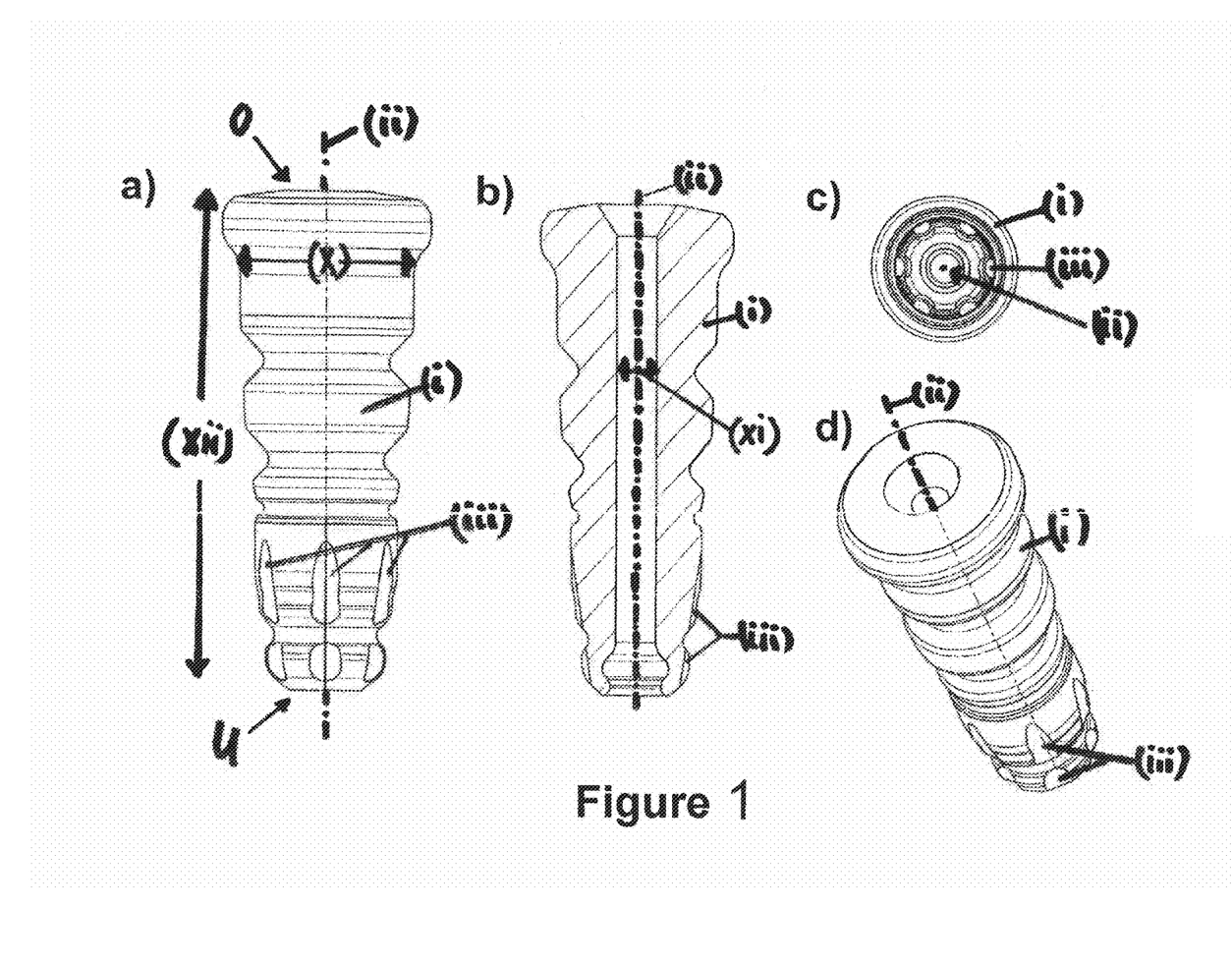
FIG. 1 shows a spring element (i) comprising a hollow body which is substantially concentric, i.e. the basic geometry of which is concentric, and is laterally provided with contour elements (iii), which in this case represent constrictions of the hollow body.
Figure 2:
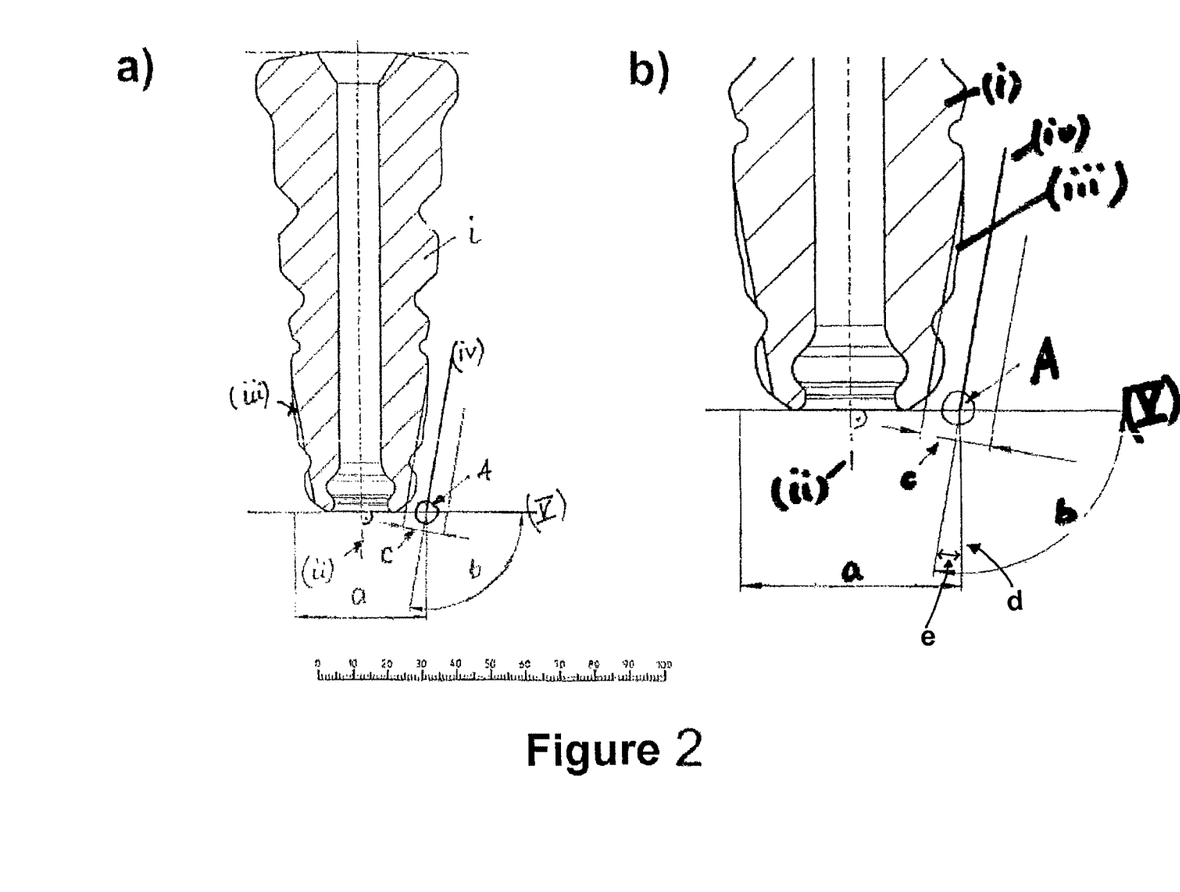
FIG. 2 shows a section through a spring element (i) which takes the form of a concentric hollow body, the inside and outside diameters of which vary along the spring axis (ii) and in which at least two contour elements (iii), here constrictions, which provide a smooth start of the spring element, are provided axially symmetrically in the lower third.
Figure 3:
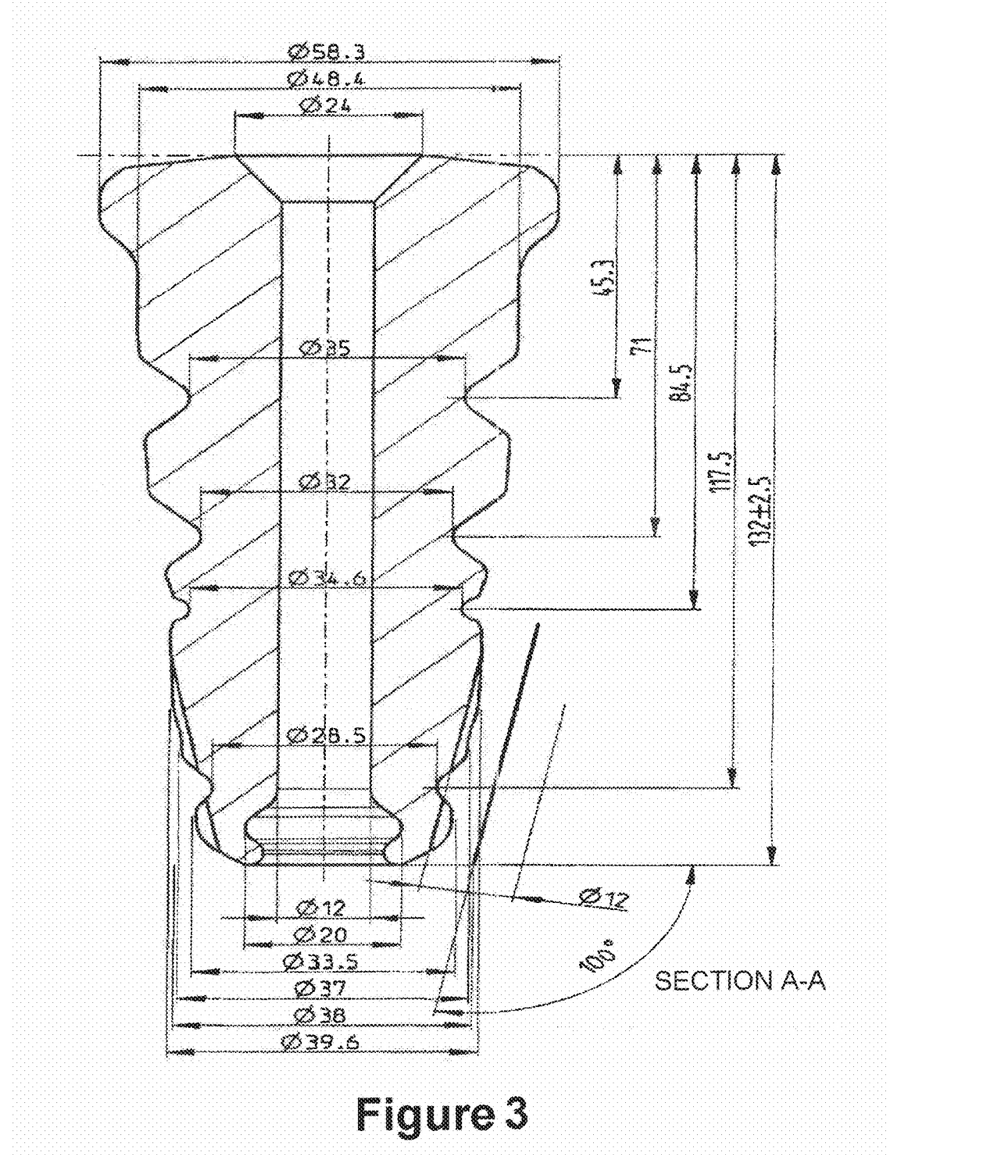
FIG. 3 shows a section through a preferred spring element, for which the geometrical data are represented and which comprises 6 in each case axially symmetrical contour elements in pairs in its lower third. The diameters in FIG. 3, in the order from top to bottom, are: 58.3 mm, 48.4 mm, 24 mm, 35 mm, 32 mm, 34.6 mm, 28.5 mm, 12 mm, 20 mm, 33.5 mm, 37 mm, 38 mm, 39.6 mm. The angle (b) in relation to the contour element is 100°. The diameter (c) of this cylinder producing the contour is 12 mm. Outer dimensions of the spring element in the representation to the right of the spring element, from inside to outside: 45.3 mm, 71 mm, 84.5 mm, 117.5 mm, 132+/−2.5 mm. The dimensions are given by way of example and may vary greatly in individual embodiments according to the requirement of individual spring elements. In further preferred embodiments, the ratios of the abovementioned dimensions with respect to one another remain the same when the size is changed.
Figure 4:
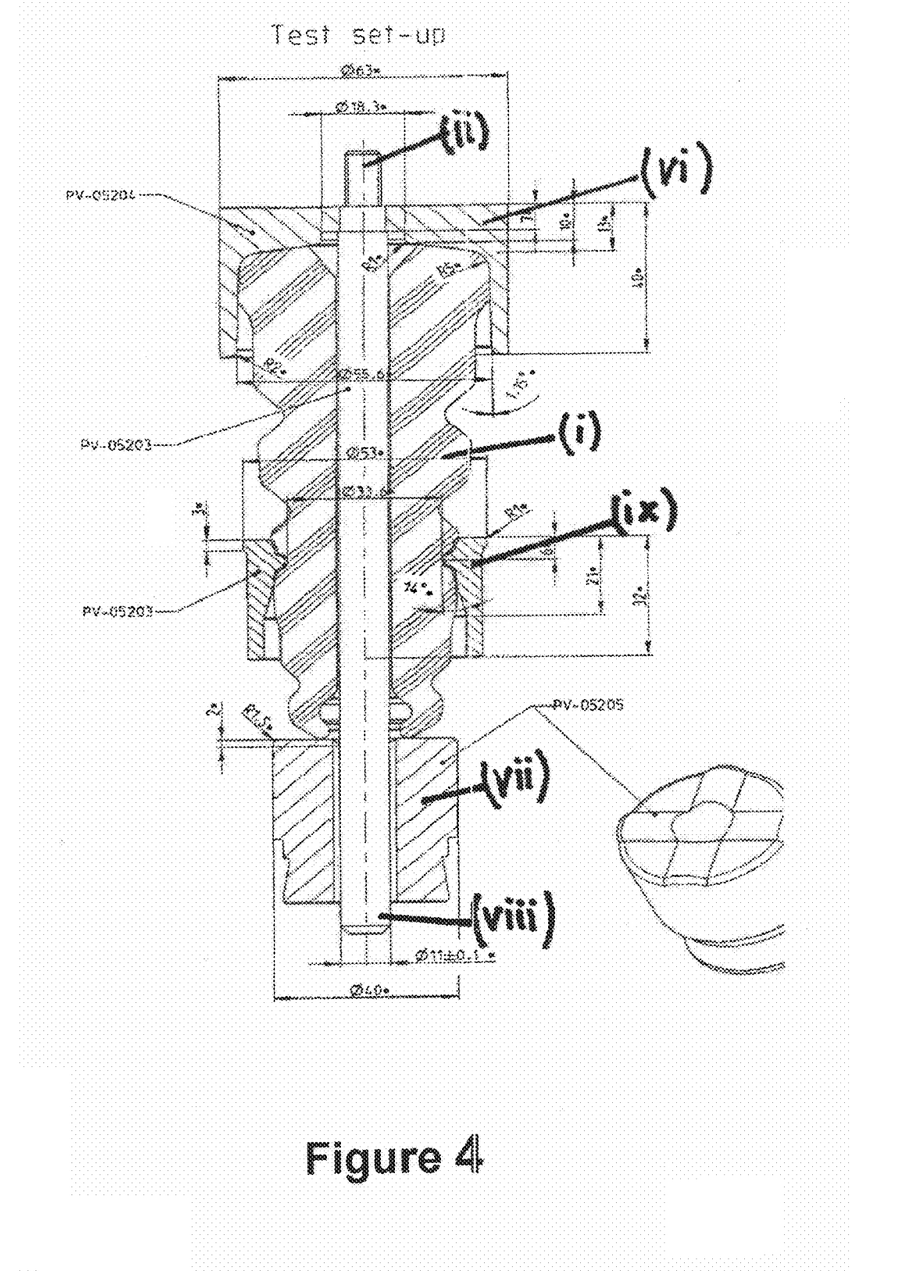
FIG. 4 illustrates the test setup that is used for determining the characteristic curve of the spring element (i). The device comprises a supporting pot (vii), a piston rod (viii), a spring element (i) with a spring axis (ii), a protective tube (ix) and an absorber cap (vi). The supplementary spring is loaded axially, i.e. along the spring axis, and a force-displacement characteristic curve is recorded while it is subjected to this load.
Figure 5:
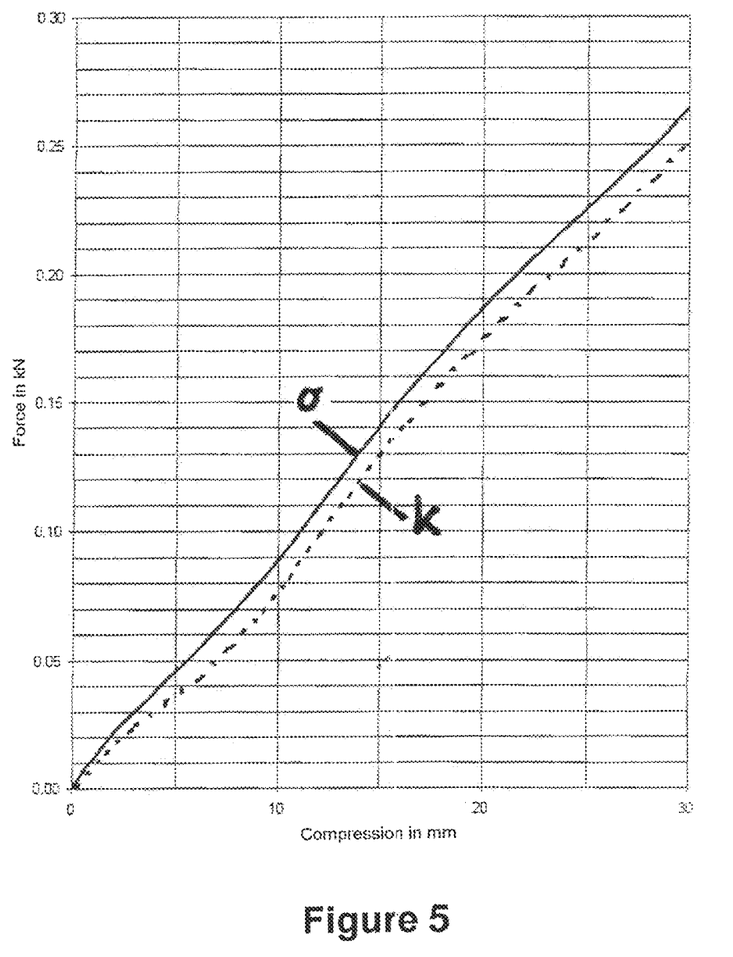
FIG. 5 shows the result of the recording of a force-displacement characteristic curve as recorded with the apparatus described with reference to FIG. 4. The force in kN between 0 kN and 0.3 kN is plotted in the y direction, the compression of the spring element in the unit [mm] between 0 mm and 30 mm is represented in the x direction.
Figure 6:
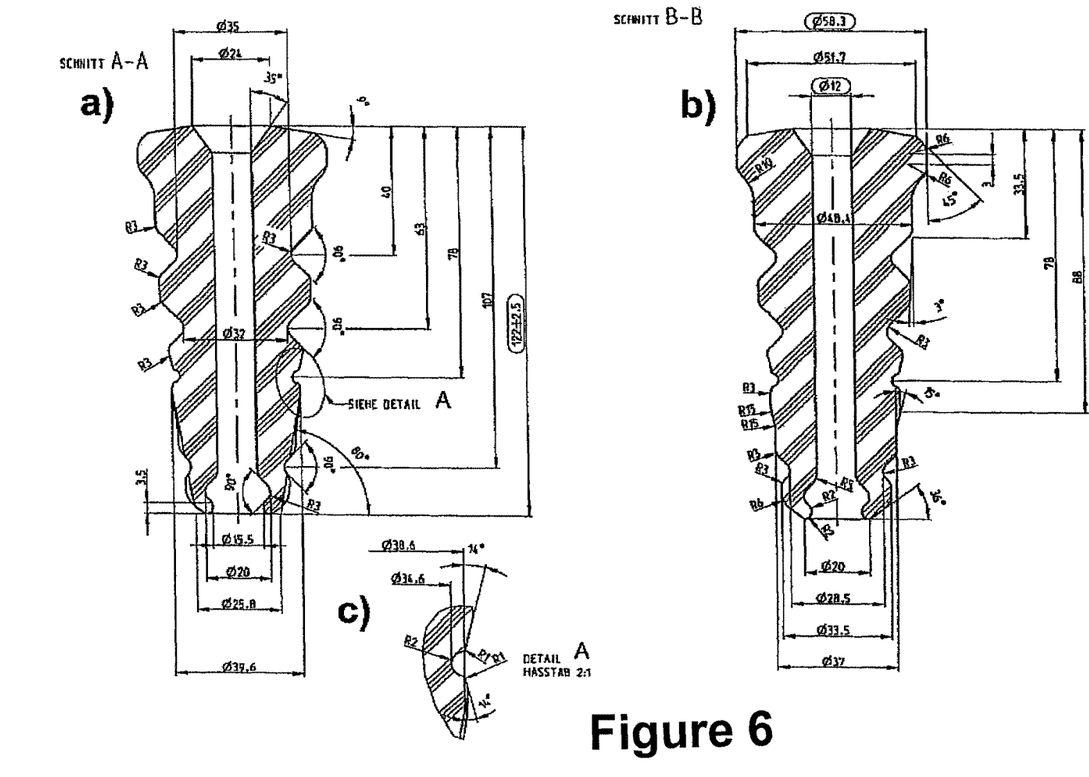
FIG. 6 shows two sections (section A-A and section B-B), which are perpendicular to each other, through a preferred spring element, for which the geometrical data are represented and which comprises 6 in each case axially symmetrical contour elements in pairs in its lower third.

The spring element (i) according to the invention comprises at least one elastomer and has a concentric basic geometry, interrupted by the axially running contour elements according to the invention. Concentric geometry means that the spring element (i) is formed such that it is circular about the spring axis (ii), it being possible for the diameters (x) of the corresponding circles to vary along the spring axis (ii). The scope of the invention includes not only full-volume spring elements but also spring elements that take the form of a hollow body, as represented for example in FIG. 1. Unlike the full-volume spring element, a spring element that takes the form of a hollow body is not only characterized by the diameter (x), which is at the same time the outside diameter (x), but is delimited on the inside by the inside diameter (xi), so that there is no elastomer between the spring axis and the inside diameter along the spring axis (ii). In preferred embodiments, the inside diameter, the outside diameter or both diameters varies (vary) along the spring axis, in order to correspond to the respective specific requirements for the spring characteristic.

According to the invention, constrictions (iii) or widenings, which interrupt the form of the otherwise concentrically constructed spring element, are located along or in the main direction of the spring axis (ii) of the spring element (i). Reference to this property is also made by the expression "geometry which is substantially concentric along the spring axis". If at one location there is less elastomer than in the concentric form taken as a reference, this represents a constriction of the spring element (i); if a location has additional elastomer, this is a widening of the spring element. The constrictions or widenings are also collectively referred to as contour elements. In the case of a spring element that takes the form of a hollow body, the contour elements (iii) may interrupt the basic concentric figure of the spring element (i) from the inside, from the outside or from the inside and the outside. In the case of a full-volume spring element, the contour elements can of course only be provided on the outside. In order to ensure the stability of the spring element, these constrictions (iii) and or widenings (iii) must lie axially symmetrically in relation to the spring axis. In the case of the basic concentric form, therefore, the same contour element (iii) is present each time it is turned by 180.degree. about the spring axis. If a straight line (d) is drawn through the longest extent of a contour element, in a preferred embodiment this line is, seen in a radial perspective with respect to the spring axis (ii), parallel to the latter. However, the straight line through the longest extent may also form an included angle e with the spring axis (ii). In preferred embodiments, this angle e lies between 0° and 45°. In further preferred embodiments, this angle e lies between 0° and 1°, 1.degree. and 5°, 5° and 15°, 15° and 30°, 30° and 45°. 0°, 22.5° and 45° are particularly preferred. In preferred embodiments, the contour elements (iii) occur 2 times, 4 times, 6 times, 8 times, 10 times, 12 times or any number of times divisible by 2 on a substantially concentric spring element. These contour elements (iii) may have the same form or different forms, two contour elements that respectively lie 180° opposite each other in axial view respectively having the same forms in preferred embodiments. The offset between two respectively associated axially symmetrical contour elements may be uniform or non-uniform, at any desired angle. In a preferred embodiment, the contour elements are, however, uniformly distributed over 360° in axial view.

The spring characteristic of the spring element (i) is influenced by the shaping of the contour elements (iii). In a preferred embodiment, the contour element (iii) is used to achieve a smooth start of the spring element (i). The contour elements are then preferably positioned along the parts of the spring elements that are thinner in radial view. In a further preferred embodiment, they are in the first and/or last third of the spring element in radial view, i.e. the contour elements are either only in the third which faces the upper end O of the spring element (first third), or only in the third which faces the lower end U of the spring element (last third), or both in the first third and in the last third. In other preferred embodiments, the structural elements are provided along the entire spring axis. In further embodiments, a number of contour elements are combined on the spring element. In a particularly preferred embodiment, at least two axially symmetrical contour elements are provided in the lower or last and/or upper, i.e. first third of the spring element (i), particularly preferably comprising 6 or 8 contour elements uniformly distributed in axial view.

In a preferred embodiment, the contour elements are arranged parallel to the surface. Constrictions of the spring element may also be referred to as notches, milled reliefs or recesses. The contour elements may be rectangular, elliptical, trapezoidal or triangular in radial view, or composed of any desired combinations of these basic forms. In some embodiments, the contour elements (iii) represent a uniform constriction and/or widening of the concentric basic form of the spring element (i), in other embodiments the constriction (iii) and/or widening (iii) varies along the spring axis (ii). This variation of the contour elements (iii) is also directly associated with the spring characteristic of the spring element and is to be adapted to the respective requirements and permits advantageous damping characteristics in the case of a predetermined geometry of the spring element.

The spring element may take dimensions, i.e. lengths and diameters, that are generally customary for supplementary springs. The spring element (i) preferably has a height (xii) of between 30 mm and 200 mm, particularly preferably between 40 mm and 120 mm. The outer diameter (x) of the spring element (i) is preferably between 30 mm and 100 mm, particularly preferably between 40 mm and 70 mm. The inside diameter (xi) of the hollow space of the spring element (i) is preferably between 10 mm and 30 mm.

In a preferred embodiment, the spring elements (i) according to the invention are based on generally known elastomers, such as for example rubber or polyisocyanate polyaddition products. In this case, a spring element may comprise one elastomer, but may also comprise a number of elastomers that are in the form of layers or shells or in some other form, or else are mixed with one another. The polyisocyanate polyaddition products are preferably based on cellular polyurethane elastomers, based on thermoplastic polyurethane or constructed from combinations of these two materials, which may, if appropriate, comprise polyurea structures. Particularly preferred are cellular polyurethane elastomers, which in a preferred embodiment have a density in accordance with DIN 53420 of 200 kg/m$^3$ to 1100 kg/m$^3$, preferably 300 kg/m$^3$ to 800 kg/m$^3$, a tensile strength in accordance with DIN 53571 of 2 N/mm$^2$, preferably 2 N/mm$^2$ to 8 N/mm$^2$, an elongation in accordance with DIN 53571 of 300%, preferably 300% to 700%, and a tear propagation resistance in accordance with DIN 53515 of preferably 8 N/mm to 25 N/mm.

The elastomers are preferably microcellular elastomers on the basis of polyisocyanate polyaddition products, preferably having cells with a diameter of from 0.01 mm to 0.5 mm, particularly preferably 0.01 to 0.15 mm. Particularly preferably, the elastomers have the physical properties described at the beginning.

A further element of the invention is a shock absorber that comprises at least one of the spring elements according to the invention. The spring element according to the invention may be used on its own as a shock absorber in a suitable device. Often, however, the spring element is combined with conventional springs and/or damping elements. Spring elements that are hollow bodies which are positioned such that their axis coincides with the spring axis are preferably used here.

The invention further covers devices and vehicles that comprise a spring element according to the invention.

Elastomers on the basis of polyisocyanate polyaddition products and their preparation are generally known and variously described, for example in EP-A 62 835, EP-A 36 994, EP-A 250 969, DE-A 195 48 770 and DE-A 195 48 771.

The preparation usually takes place by reacting isocyanates with compounds that are reactive to isocyanates.

The elastomers on the basis of cellular polyisocyanate polyaddition products are usually prepared in a mold in which the reactive starting components are reacted with one another. Conventional molds, for example metal molds, which by their form ensure the three-dimensional form of the spring element according to the invention, generally come into consideration here as molds. In one embodiment, the contour elements are integrated directly in the mold, in a further embodiment they are subsequently incorporated in the concentric basic body. In a preferred embodiment, for this purpose the concentric spring element is cooled until it solidifies, preferably with liquid nitrogen, and is processed in this state.

The preparation of the polyisocyanate polyaddition products may take place on the basis of generally known methods, for example by using the following starting materials in a one-stage or two-stage process:
(a) isocyanate,
(b) compounds reactive to isocyanates
(c) water and, if appropriate,
(d) catalysts,
(e) blowing agents and/or
(f) auxiliaries and/or additives, for example polysiloxanes and/or fatty acid sulfonates.

The surface temperature of the inner wall of the mold is usually 40° C. to 95° C., preferably 50° C. to 90° C.

The production of the molded parts is advantageously carried out using an NCO/OH ratio of from 0.85 to 1.20, the heated starting components being mixed and introduced into a heated, preferably tightly closing mold in an amount corresponding to the desired density of the molded part.

The molded parts are cured after 5 minutes to 60 minutes and consequently can be demolded.

The amount of reaction mixture introduced into the mold is usually set such that the moldings obtained have the density already described.

The starting components are usually introduced into the mold at a temperature of from 15 to 120° C., preferably from 30 to 110° C. The degrees of compaction for producing the moldings lie between 1.1 and 8, preferably between 2 and 6.

The cellular polyisocyanate polyaddition products are expediently prepared by the one-shot process with the aid of the low-pressure technique or, in particular, the reaction injection-molding technique (RIM) in open or preferably closed molds. The reaction is carried out in particular with compaction in a closed mold. The reaction injection-molding technique is described, for example, by H. Piechota and H. Röhr in "Integralschaumstoffe" [integral foams], Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76-84.

The invention claimed is:

1. A spring element with a geometry which is substantially concentric along a spring axis of the spring element, the spring element comprising:
   a main body including:
      a plurality of grooves formed at intervals along an outer surface of the main body in a direction of the spring axis, wherein a diameter of the main body at a groove is smaller than a diameter of the main body in an area adjacent to the groove;
   at least one elastomer; and
   a plurality of contour elements having a circular cross-section located on opposite sides of the spring axis from each other along a line perpendicular to the spring axis, wherein
   the plurality of contour elements are located on the outer surface of the main body and separate from the plurality of grooves so that a diameter of the main body at a contour element is greater than a diameter of the main body in an area adjacent to the contour element along the direction of the spring axis,
   each contour element of the plurality of contour elements is defined by a cylinder extending along an element axis and having the circular cross-section in a plane perpendicular to the element axis, and
   the element axis makes an angle of 0° to 45° with the spring axis.

2. The spring element according to claim 1, wherein the spring element is a hollow body along the spring axis.

3. The spring element according to claim 1, wherein the elastomer is rubber and/or polyisocyanate polyaddition product.

4. A shock absorber, comprising:
   at least one spring element with a geometry which is substantially concentric along a spring axis of the at least one spring element, the at least one spring element including:
      a plurality of grooves formed at intervals along an outer surface of the spring element in a direction of the spring axis, wherein a diameter of the spring element at a groove is smaller than a diameter of the spring element in an area adjacent to the groove;
      at least one elastomer; and
      a plurality of contour elements having a circular cross-section located on opposite sides of the spring axis from each other along a line perpendicular to the spring axis, wherein
   the plurality of contour elements are located on the outer surface of the spring element and separate from the plurality of grooves so that a diameter of the spring element at a contour element is greater than a diameter of the spring element in an area adjacent to the contour element along the direction of the spring axis,
   each contour element of the plurality of contour elements is defined by a cylinder extending along an element axis and having the circular cross-section in a plane perpendicular to the element axis, and
   the element axis makes an angle of 0° to 45° with the spring axis.

5. A vehicle or device comprising:
   a spring element including:
      at least one elastomer with a geometry which is substantially concentric along a spring axis of the spring element;
      a plurality of grooves formed at intervals along an outer surface of the spring element in a direction of the spring axis, wherein a diameter of the spring element at a groove is smaller than a diameter of the spring element in an area adjacent to the groove;
      a plurality of contour elements having a circular cross-section located on opposite sides of the spring axis from each other along a line perpendicular to the spring axis, wherein
   the plurality of contour elements are located on the outer surface of the spring element and separate from the plurality of grooves so that a diameter of the spring element at a contour element is greater than a diameter of the spring element in an area adjacent to the contour element along the direction of the spring axis,
   each contour element of the plurality of contour elements is defined by a cylinder extending along an element axis and having the circular cross-section in a plane perpendicular to the element axis, and the element axis makes an angle of 0° to 45° with the spring axis.

6. The spring element according to claim 1, wherein the contour elements are located only in a lower one third of the main body.

7. The spring element according to claim 1, wherein a diameter of the circular cross-section of the contour elements is 12 mm.

8. The spring element according to claim 1, wherein the spring element includes 2, 4, 6, 8, 10, or 12 contour elements.

9. A spring element with a geometry which is substantially concentric along a spring axis of the spring element, the spring element comprising:

a main body including:
   a plurality of grooves formed at intervals along an outer surface of the main body in a direction of the spring axis, wherein a diameter of the main body at a groove is smaller than a diameter of the main body in an area adjacent to the groove;
at least one elastomer; and
6 or 8 contour elements having a circular cross-section uniformly distributed around the spring axis such that pairs of elements are located on opposite sides of the spring axis from each other along a line perpendicular to the spring axis, wherein the 6 or 8 contour elements are located on the outer surface of the main body and separate from the plurality of grooves so that a diameter of the main body at a contour element is greater than a diameter of the main body in an area adjacent to the contour element along the direction of the spring axis, each contour element of the 6 or 8 contour elements is defined by a cylinder extending along an element axis and having the circular cross-section in a plane perpendicular to the element axis, and the element axis makes an angle of 0° to 45° with the spring axis.

10. The spring element according to claim 9, wherein the angle is between 0° and 22.5°.

11. The spring element according to claim 1, wherein the angle is between 0° and 22.5°.

12. The shock absorber according to claim 4, wherein the angle is between 0° and 22.5°.

13. The vehicle or device according to claim 5, wherein the angle is between 0° and 22.5°.

14. The spring element according to claim 10, wherein the angle is between 5° and 15°.

15. The spring element according to claim 11, wherein the angle is between 5° and 15°.

16. The shock absorber according to claim 12, wherein the angle is between 5° and 15°.

17. The vehicle or device according to claim 13, wherein the angle is between 5° and 15°.

18. The spring element according to claim 1, wherein the angle is between 0° and 30°.

19. The shock absorber according to claim 4, wherein the angle is between 0° and 30°.

20. The vehicle or device according to claim 5, wherein the angle is between 0° and 30°.

* * * * *